United States Patent [19]

Kumar

[11] Patent Number: 5,853,780
[45] Date of Patent: Dec. 29, 1998

[54] BEVERAGE MAKING PENCIL

[76] Inventor: Ajaya Kumar, P.O. Box 4563, New Delhi, India, 110016

[21] Appl. No.: 712,085

[22] Filed: Sep. 11, 1996

[51] Int. Cl.$^6$ .......................... B65B 29/02; A21D 10/02; B65D 85/00
[52] U.S. Cl. .............................. 426/82; 426/77; 426/112; 426/115; 426/120
[58] Field of Search ................................ 426/82, 112, 77, 426/115, 78, 79, 84, 86; 206/217, 519; 99/287, 295

[56] References Cited

U.S. PATENT DOCUMENTS

| | | | |
|---|---|---|---|
| 2,737,373 | 3/1956 | Kinley | 259/128 |
| 3,811,373 | 5/1974 | Telco | 99/295 |
| 4,136,202 | 1/1979 | Farre | 426/77 |
| 4,844,914 | 7/1989 | Bonnie et al. | 426/79 |
| 4,886,674 | 12/1989 | Seward et al. | 426/79 |
| 4,983,412 | 1/1991 | Hauslein | 426/238 |
| 5,108,768 | 4/1992 | So | 426/77 |

*Primary Examiner*—Ponnathapura Achutamurthy
*Assistant Examiner*—Brett Nelson
*Attorney, Agent, or Firm*—Larson & Taylor

[57] ABSTRACT

A hand held device for preparation of beverages of desired composition and strength has a source stuff (11) of the beverage packaged in a porous pouch (14) supported on a cage framework (12), emanating downwards from a pedestal (16), and the pouch (14) is encased within the device in cavity of a concave cap (13). A plurality of capsules (22,32), each containing an adjunct (21,31) of the beverage respectively, are mounted above the pedestal (16) to form a portable pencil of capsules. The framework (12) and the pouch (14) containing the stuff (11) cooperate as a commingling infuser stirrer, when shuffled in the liquid medium of the beverage, thereby enhancing combination of the stuff (11) and the medium. Fork (44) and knife (43) projections protrude on exterior of the cap (13). A fluid is injectible through the stuff (11) and the prepared beverage.

20 Claims, 4 Drawing Sheets

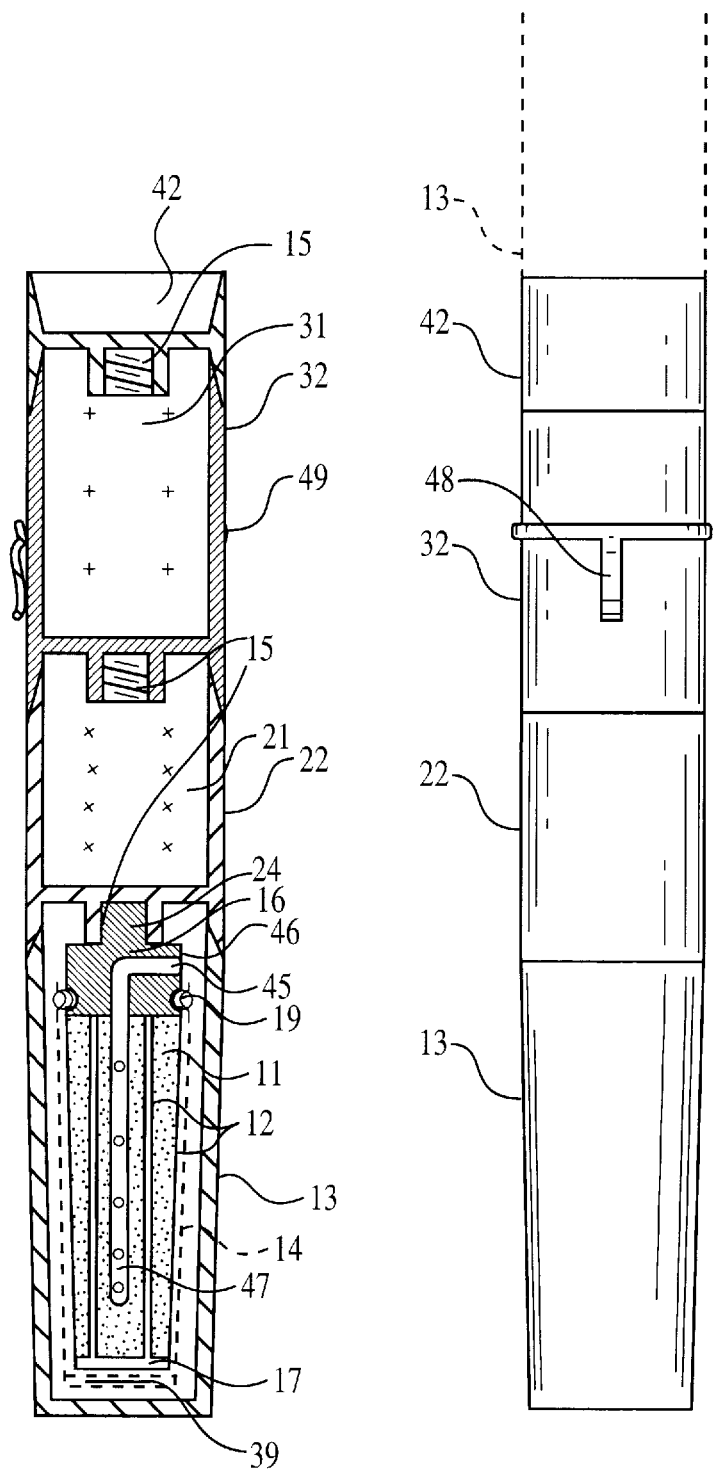

BEVERAGE MAKING PENCIL

This invention is in the field concerning methods, means and devices for consumer preparation of beverages. More particularly, the present invention concerns a method, means and device for convenient, quick and hygienic preparation of beverages of individually desired composition and strength.

Consumers prepare a beverage such as tea, coffee, cocoa, and chocolate, from a beverage source stuff which is procurable commonly in form of leaves, crumbs, powder, granules or crystals, packed in card, plastic, glass or metal containers to. A consumer opens a chosen package, and scoops out a selected measure of the stuff with a spoon into a cup or other vessel. Preparation of the chosen beverage follows, by means of combining the stuff with a liquid medium, but irrespective of the artifice employed for effecting the combination, many deficiencies occur here.

An unhygienic scooping spoon can infect the entire stuff in the package. Stirring has to be done with a separate spoon which must be clean when dipped into the beverage. In bulk packages, the source stuff is exposed to atmosphere every time that the package is reopened for scooping out the stuff, whereby the stuff can deteriorate during storage. Risk of unscruplous adulteration of the stuff between its packaging and ultimate consumption is possible.

In the course of preparation of the beverage the consumer has to perform many human acts and anatomical movements, some of which are: Cleaning the scooping spoon; scooping; procuring a clean stirring spoon; procuring adjuncts of the beverage such as sugar, low calories sugar, lemon extract powder, cream, milk and the like, either in single dose packages, or storing the adjuncts in separate hygienic table-ware receptacles with their respective clean scooping spoons, and bringing to the consumption site; reaching out for the adjuncts. These acts and motions are significant because drink preparation is a frequent daily act, and consumers have limited time and limited own human energy at their disposal due to the fast pace of life.

Moreover, when a quantity of a beverage has been prepared for an assembly of persons, composition and strength of the beverage cannot be simply and readily altered to suit respective individual consumer's tastes. Also, choice of drink is limited to one type of beverage until a whole bulk package of its source stuff is consumed.

Control over strength of his drink and a one time use package is facilitated to an individual consumer by means of a device commonly termed as tea bag: A porous paper bag containing instant tea source stuff for producing one cup of tea is suspended on a string, and dipped in a cup of hot water until the desired strength of the tea has been obtained. Thereafter the limp bag is pulled out of the tea beverage, and placed on a saucer or thrown into a bin.

This wet bag keeps dripping after its withdrawal from the cup, strewing droplets, and cannot be handled firmly and crisply. Prior to the dipping too, the dry bag and string have a tendency to collapse on receptacles on which they may be kept, and imbibe unhygienic particles. A spoon has to be arranged separately for stirring which should be clean when dipped into the beverage. The tea stuff infuses into the water slowly, which wastes time and lets the hot water loose calories. Beverage adjuncts such as sugar, milk and the like, which are often not readily available at any desired time and place, have to be procured in single dose packages or transferred from bulk storage to separate hygienic table-ware receptacles and brought with their respective clean scooping spoons to consumption site.

Classic brewings in pot, percolator and the like yield a beverage of true taste and flavour, but are slow and require space and compatible heating devices, which facilities are not readily available at every moment and place, such as for personnel preoccupied with their duties at construction and other exercise sites, in offices and factories, in institutions, for tourists and salesmen. Strength of a brew prepared for an assembly of consumers and obtained after much ado, cannot be easily tuned up to suit the wishes of respective individual consumers. Beverage adjuncts may not be readily available. Spoons have to be arranged, which must be clean at the time of putting them to use.

For today's busy consumer a frequent and daily act of drink preparation should be reduced to a convenient and quick process, specially so for an itinerant person. He should not be required to arrange for a beverage source stuff scooping spoon, beverage adjuncts scooping spoons, and a stirring spoon, nor to clean the respective spoons at the time of their use. Unhygienic particles should not find their way into his drink via the spoons, nor via a tea bag string. Beverage adjuncts should be readily available. He should be able to control composition and strength of the beverage. Risk of unscruplous adulteration of the stuff and the adjuncts be avoided. Human acts and motions should be minimal.

This invention meets these requirements and yields not only practical benefits related to consumer preparation of a beverage, but also caters to a connoisseur of beverages.

This invention may however use instantly soluble synthesized extracts of beverages to prepare a quick drink which could lack the character of a normal classic brew infusion or percolation in cases of some beverages like tea or coffee. Costs involved in refilling small quantitites of beverage ingredients in the device of this invention also detract from achievements of the invention. On the other hand objects and advantages of the invention are several: To (a) allow beverage source stuff and adjuncts to he available in a pocket sized, light weight but rigid and neatly portable composite package;

(b) provide a packaging that is easy to refill, sterilize, and seal-wrap, for reuse, thereby saving costs;

(c) incorporate a commingling infuser stirrer, for enhancing infusion of a source stuff of a beverage into liquid medium, thereby also accelerating formation of the beverage;

(d) eliminate any need for scooping spoons and stirring spoons, for the sake of a consumer's convenience and to avoid risk of an unhygienic spoon contaminating a drink;

(e) provide a consumer with options of storing on his shelf a number of tiny, rigid and portable capsules each containing a different source stuff of a beverage or a different adjunct of a beverage respectively, and therefore to be able to pick his choice and composition of beverage at any time; i.e., the range of choice of beverage ingredients should be wide, but each capsuled beverage ingredient should be of minor value and volume;

(f) offer in a single device, choices from therein packaged beverage ingredients, and control of amount of each of the ingredients in a beverage mix, simply and without fuss, at the final moment of preparation of the beverage, to cater to a connoisseur;

(g) offer facility to quickly assemble into a pencil formation a selection of beverage source stuff and adjuncts;

(h) let fewer human acts and anatomical movements of a consumer suffice to prepare a beverage;

(i) provide facility for injecting a fluid through a source stuff of a beverage and into the beverage for obtaining a desired beverage feature;

(j) provide sick people, busy and itinerant persons, school going children, and the like, a quick and ready facility to take-out-from-the-pocket-and-prepare a medicinal or nutritional or other drink, during any emergency or on scheduled time;

(k) avoid risk of adulteration of beverage source stuff and beverage adjuncts in course of commerce between packaging of the stuff and the adjuncts and their utilisation by ultimate consumer, by reaching the stuff and the adjuncts from a packer of the stuff and the adjuncts to an ultimate consumer of the beverage in sealed capsules;

(l) be environment friendly, by allowing repeat refilling and reuse of enclosures of the beverage making pencil of this invention;

(m) carry appendages of knife and fork on the device of this invention for handling solid edibles that often accompany beverages.

Further objects and advantages of the invention become recognisable from a consideration of the following description.

A non-limiting example of the invention is now described in junction with accompanying drawings wherein reference numerals represent following items:

11 source stuff of beverage
12 cage framework
13 cap
14 pouch
15 standard screw threads
16 pedestal
17 ring at lower end of framework 12
18 groove
19 elastic circlet
21 first adjunct
22 capsule containing first adjunct
23 first cylinder in pedestal 16
24 second cylinder in pedestal 16
35 third cylinder in pedestal 16
31 second adjunct
32 capsule containing second adjunct
36 notch
37 furrow
38 projection
39 staple clasp
42 plug
43 knife edge
44 fork protrusions
45 tubular passage
46 diaphragm
47 perforated tube
48 in-pocket-carrying clip lever
49 girdle
50 slit Briefly stated, the drawings depict following aspects:

FIG. 1 shows schematically in sectional view a preferred embodiment of a beverage making device according to the present invention.

FIG. 2 shows an external view of the device of FIG. 1

Figure 3:
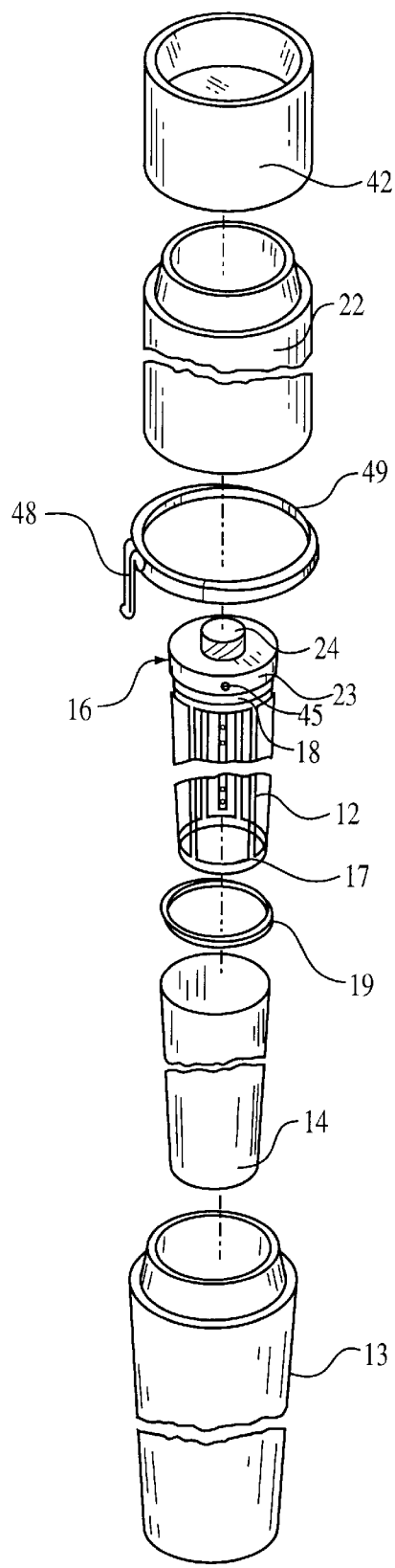
FIG. 3 shows an exploded view of the device of FIG. 1, however with only one adjunct containing capsule incorporated in the device.

Device of FIG. 1 is composed on a pedestal 16. The pedestal 16 in this figure comprises an upright solid circular cylinder 23, upper and lower horizontal facets of the cylinder 23 being flat surfaces, from the upper facet emerging upwards a second narrower circular solid cylinder 24 coaxial with the cylinder 23 and threaded with M6 standard screw threads 15, at the periphery of the lower facet a plurality of circumferentially equidistant radially inwards tilting ribs of minimal thickness and width emanating downwards and terminating at lower end of the ribs into 1 mm high paper thin annular ring 17, thereby the ribs and the ring 17 making up a hollow cage framework 12 of inverted substantially frusta conical shape. In vertically oriented round surface of the cylinder 23 a circumferential 2 mm deep semicircular trough shaped groove 18 is engraved parallel to and 1 mm above the lower facet. The pedestal 16 and the framework 12 including the ring 17 are made of non toxic, non hygroscopic, chemically inert, 100 degrees Celcius withstanding material, being in this example moulded from polybutylene terephthalate resins which are available from General Electric Company of America and its subsidiary companies under their brand name Valox.

A supple pouch 14 shaped like a hollow pipe dimensionally slide fitting around the framework 12 and open mouthed at upper and lower ends is slid up around the framework 12 whereby the framework 12 mechanically supports the pouch 14 in the device of FIG. 1. In the cited example six numbers of the ribs each 0.7 mm wide and 0.5 mm thick comprise the framework 12 but in alternative configurations of the device fewer of the ribs suffice to furnish unflinching support to the supple pouch 14.

Figure 4:
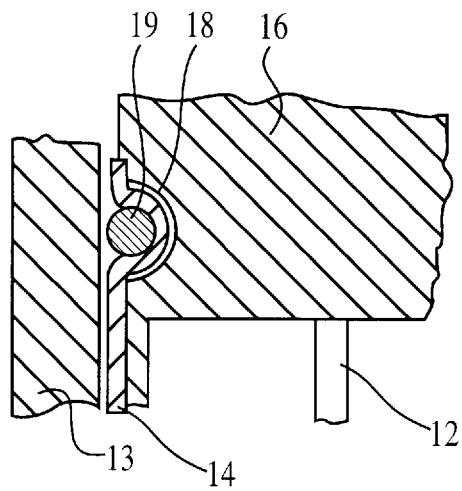
FIG. 4 shows schematically in enlarged sectional view a fastening of the pouch 14 of FIG. 1.

The supple pouch 14 is fastened to the pedestal 16 as depicted in FIG. 4 by means of a taut stretched circumjacent annular elastic 2 mm round cross-section circlet 19 of 100 degrees C temperature resistant synthetic rubber pressing annular border at the upper end of the pouch 14 into the trough of the groove 18, thereby firmly lashing down the border in the groove 18 and holding an empty or filled pouch 14 firmly on the pedestal 16 under all operating conditions and during transhipment of the device.

A predetermined quantity of a source stuff 11 of a beverage is filled into the pouch 14 through the open mouth at the lower end of the pouch 14 so as to allow the surplus empty axial length of the pouch 14 at the lower end of the pouch 14 to be closed pressed flat, the extreme 2 mm axial length thereat folded back and stapled shut by means of a tin plated staple clasp 39 so as to fashion a sack enclosure wherefrom egress of the therein filled quantity of the stuff 11 is thereby restricted till immersion of the pouch 14 into a liquid.

In alternative configurations the annular rubber circlet 19 is substituted with nylon string looped and knotted taut to press the upper end border of the pouch 14 into the groove 18, or the edge of the upper end of the pouch 14 is fused to the pedestal 16, and the open lower end of the pouch 14 is shut, in lieu of being stapled, by means of a fitting polybutylene terephthalate stopple or by means of a looped and knotted nylon string.

The stuff 11 in combination with a liquid medium produces the beverage. In the cited example the stuff 11 is instant coffee granules, the quantity of the granules being 10 ml, which is adequate to produce two cups of instant coffee, and the medium is hot water stored in a vessel such as a cup or a mug. Here the cylinder 23 has diameter of 18 mm and height in the range of 4 to 12 mm, the cylinder 24 has height of 6 mm, and the cage frame 12 has height of 50 mm, the ring 17 has diameter of 14 mm, axial length of the unfilled pouch 14 is 68 mm.

Wall of the pouch 14 is laminar thin and substantially impervious to escapement of the stuff 11 whereby the stuff 11 is containable within the pouch 11 in case of the present example, but is adequately porous to allow passage of the medium and of the formed beverage therethrough. Good results are obtained with the pouch 14 composed of laminar sheet polypropylene filter material with orifices of 60 microns, 12% of total surface being a passage surface in case of present example of instant coffee granules. With dispersion type drinks such as soups or powdered chocolate it is advantageous to use relatively coarse mesh filter web. For tea a disposable porous paper pouch 14 does well.

Figures 7, 8:
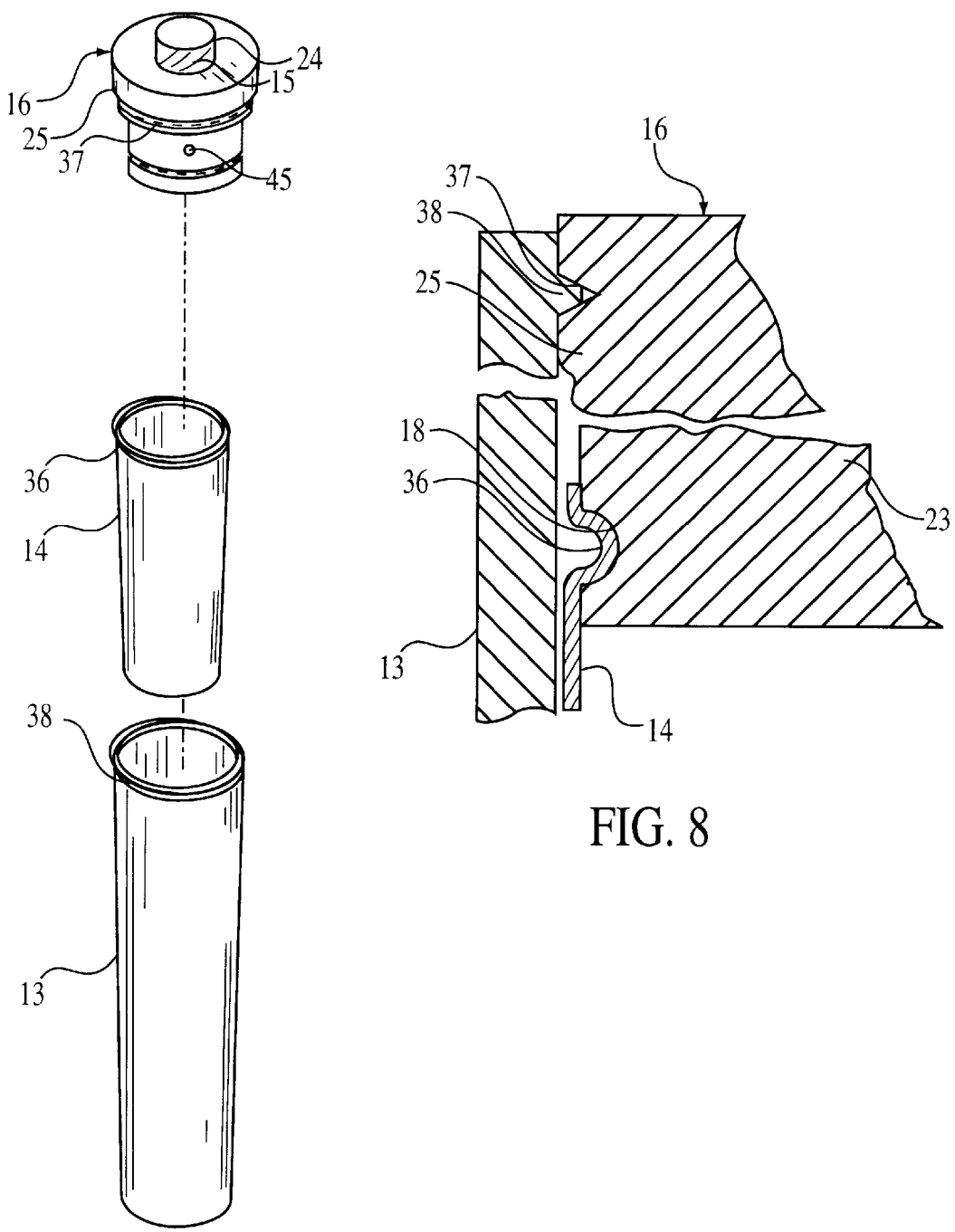
FIG. 7 shows an exploded view illustrating a stiff pouch, and a cap which mounts directly on a pedestal.
FIG. 8 shows schematically in enlarged sectional view a mounting of the pouch and of the cap of FIG. 7.

In an alternative configuration of the pouch 14 wall of the pouch is not supple but is of self supporting stiff hollow pipe shaped construction sufficiently rigid to be form sustaining in use, such as formed of a laminar thin 60 micron mesh 12% of whose total surface is a passage surface of non magnetic AISI grade 304 stainless steel, wherewith the supporting framework 12 being redundant is eliminated from the device of this invention as illustrated in FIGS. 7 and 8. Lower edge of the cylinder 23 of FIGS. 7 and 8 is convex chamfered 1 mm radius, depth of the groove 18 is reduced to 0.5 mm here. Upper end of the pouch employed here is an open end whereas lower extremity of the pouch of this configuration is a closed end of the pouch. One mm below the upper end wall of this pouch is crimped radially inwards into a 0.5 mm high semicircular hump shaped annular notch 36 which snaps into the therewith dimensionally matching groove 18 when the upper end of the pouch is pressed upwards coaxially around the lower edge of the cylinder 23 thereby mounting the pouch on the cylinder 23.

For the purpose of injecting steam or other fluid through the source stuff 11 and into a produced beverage for obtaining any desired feature in the produced beverage a 3 mm diameter tubular passage 45 is moulded within the body of the pedestal 16. The passage 45 commences horizontally from centre of a 7 mm diameter 1 mm deep flat recess in the round surface of the cylinder 23, the lower edge of the recess lying 1 mm above the upper perimeter of the groove 18, the recess sealed mechanically by means of a synthetic rubber 7.1 mm diameter 1 mm thick flat diaphragm 46 pressed fit into the recess. The passage 45 ends vertically at centre of lower circular facet of the cylinder 23 so as to receive and grip by means of non toxic insoluble adhesive such as anaerobic sealant 542 of Loctite of France, 3 m m length of upper end of a 2.8 mm outer diameter 40 mm long chromium plated 30 swg walled brass tube 47. Thereby the tube 47 communicates with the passage 45, and is mounted on and comes out vertically downwards from the lower facet of the cylinder 23 coaxially into space encompassed within the framework 12.

The tube 47 has serial perforations of 0.8 mm diameter along its height on north, south east and south west faces of the tube 47, vertical spacing between consecutive perforations on the north face reducing progressively in the cited example from 15 mm between upper most consecutive perforations to 5 mm between lower most consecutive perforations. Vertical spacings between the perforations on the south east face of the tube 47 so too vertical spacings between the perforations on the south west face of the tube 47 are identical to the vertical spacings between the perforations on the north face of the tube 47. Lower end of the tube 47 is crumpled shut.

The screw threads 15 on the cylinder 24 screw into screw threads M6 in a hollow cylinder protruding vertically downwards at middle of circular base of a capsule or container 22 whereby the capsule 22 mounts on the pedestal 16. Walls of the capsule 22 are impervious, being here translucent moulded polypropylene 0.5 mm to 2 mm thick. Typically the capsule 22 is internally straight round hollow cylinder of 20 mm diameter and 25 mm clear height so as to contain a predetermined quantity of a beverage's first adjunct 21 which in present case is one and a half teaspoonfuls of quick dissolving low calorie sugar powder.

On gaping crown of the capsule 22 is mounted a capsule 32 similar to the capsule 22 albeit of internal clear height 32 mm and containing the beverage's second adjunct 31 which in this case is 10 ml of soluble milk powder.

A third capsule can be mounted on the second capsule 32 to offer the option of yet another adjunct of the beverage, which could be cream powder, to the consumer readily at the very moment of making the beverage.

Gaping crown of uppermost capsule, being in the cited example the capsule 32, is shut by means of a stopper plug 42.

When a beverage is not being made a concave cap 13 of substantially inverted frusta conical shape, upper face of the cap 13 being open and its lower face closed, is jointed on to the base of the capsule 22 in the device of FIG. 1 by means of external round flat sloping surface surrounding upper termination of the cap 13 in shape of an upwards pointing male frustum of an upright cone mating into a therewith dimensionally matching internal round flat sloping surface of a circumferential and coaxial downwards protrusion in the shape of a yawning female frustum of a hollow upright cone on the base of the capsule 22, such that a slight push of a consumer's fingers telescopes the male frustum into the female frustum, mating of the frusta being elasticand air tight. Thereby the cap 13 is held on the capsule 22 and thence on the pedestal 16. Contrariwise, a gentle manual pull disengages the mated frusta thereby detaching the cap 13 from the capsule 22 and exposing the pouch 14, magnitude of the pull being related to force of the push as well as to elasticity of the mating frusta and ranges between 0.1 and 0.3 kg wt. in case of the device of FIG. 1.

In jointed position of the cap 13 on the capsule 22 cavity of the cap 13 proximately encompasses the pouch 14 thereby encasing the pouch 14 within the device, wall of the cap 13 being impervious translucent 0.5 mm to 2 mm thick moulded polypropelene.

For purpose of beverage preparation, the cap 13 is disjointed from the capsule 22 thereby baring the pouch 14, inverted and mounted above the plug 42 which position of the cap 13 is shown in dotted lines in FIG. 2.

Mounting of the cap 13 on the plug 42, of the plug 42 on the capsule 32, and of the capsule 32 on the capsule 22 is effected by means of mating frusta identical to the mating frusta jointing the cap 13 to the base of the capsule 22. Axial height of overlap of the mated frusta at the joint of the cap 13 with the capsule 22 ranges from 5 mm for lightly disengaging joints, to 25 mm for persistent joints. In alternative configurations of the device of this invention the hereabove described telescoping sliding fit flat faceted frusta joints are substituted with snap action telescoping frusta joints, or Velcro joints, or embedded ferrite joints, or slide engaging type screw joints, and the like.

An alternative mounting of a cap of the device of this invention directly on a pedestal of the device of this invention is shown in FIGS. 7 and 8 wherein the lip at the open elastic upper face of the cap of this configuration being a radially inwards 0.5 mm high equilateral-V-shaped blunted circumferential projection 38 snaps into a therewith dimensionally matching horizontal and circumferential 0.5 mm deep equilateral-V-shaped furrow 37 in a cylindrical upright coaxial 2 to 4 mm high round surface 25 interposed coaxially between the cylinders 23 and 24 in the pedestal of the device of FIG. 7 when cavity of the cap of FIGS. 7 and 8 is gently pressed upwards coaxially around convex bevelled circumferential lower horizontal periphery of the surface 25 thereby the cavity proximately encompassing beverage source stuff containing pouch of the device of FIGS. 7 and 8.

Figures 5, 6:
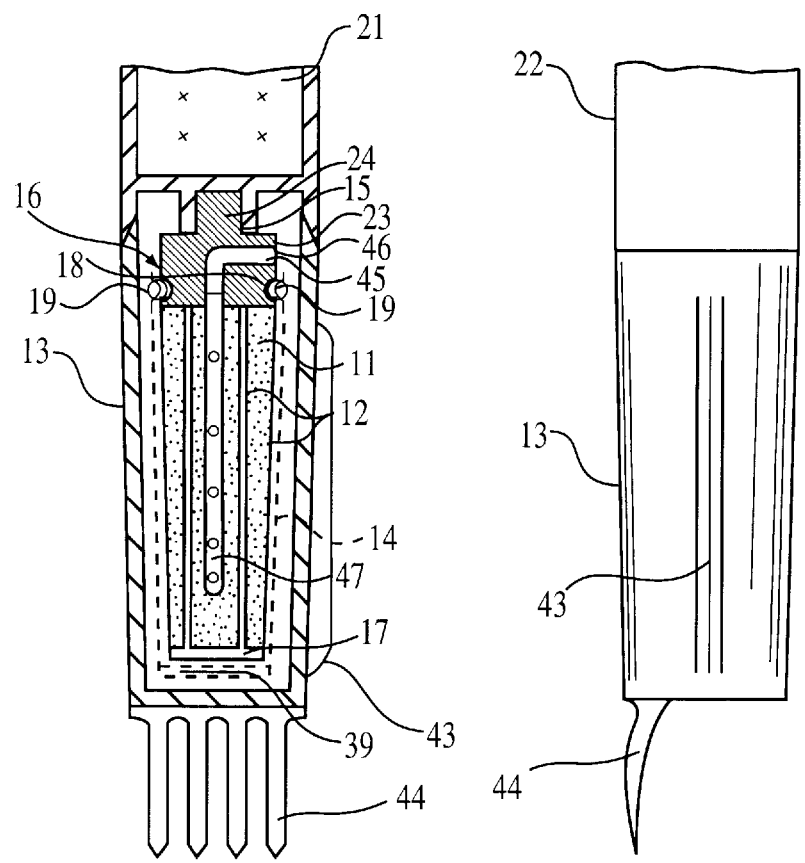
FIG. 5 shows schematically in sectional view device of FIG. 1 modified to incorporate knife 43 and fork 44.
FIG. 6 shows an external view of the device of FIG. 5

For the purpose of handling solid edibles accompanying a beverage on a tea table, a cutlery knife edge 43 and a fork 44 protrude on exterior of a thereby modified cap 13 of a device of this invention, as viewed in FIGS. 4 and 5.

Exertion of manual force on the device of FIGS. 4 and 5 to cut and fork into edibles imposes mechanical stresses in body of the device, requiring not only stronger walls of the cap and of the capsules, but also needing either a larger axial overlap height of the above described sliding fit flat faceted frusta joint, or substitution of the frusta joint with slide engaging type screw joint.

A sticker label on each of the capsules displays name and quantity of a particular beverage ingredient contained in respective capsule.

The casules 22, 32 are eliminated from the device of this invention when no adjunct of a beverage is required. The plug 42 is then screwed directly on to the cylinder 24, whereby the device is composed here of a single capsule comprising the cap 13 the pouch 14 the framework 12 the pedestal 16 and the plug 42.

For ready availability of a variety of separate beverage adjuncts each filled in a detached and single capsule similar to the capsule 22, 32 and wrap sealed with a tamper proof peelable seal, as well as for ready availability of source stuffs of a variety of different beverages each enclosed in a detached and single capsule comprising the cap 13, the pouch 14, the framework 12, the pedestal 16, and the plug 42, and wrap sealed with a tamper proof peelable seal, are stored on a consumer's shelf, awaiting assembling of a selection of any one of the stored source stuffs alongwith a selection of a few of the stored adjucts into a beverage making pencil whenever required by the consumer or by any of his guests.

Plurality of the capsules 22, 32, or more, respectively affixed one on top of another serially on the pedestal 16 and crowned by means of the plug 42, with the cap 13 enclosing the pouch 14 in the lowest capsule, compose the beverage making pencil.

A pocket clutching vertical lever clip 48 is clamped at pocket height on cylindrical round external surface of the pencil of this invention. The clamping is effected by means of an annular elastic girdle 49 attached perpendicularly at upper extremity of the lever 48, the girdle 49 riding tight fit on the round external surface of the pencil, a transverse slit 50 in the girdle 49 permitting the girdle 49 to open out circumferentially thereby encircling the round external surface and to reclose thereon so as to grip circumference of the round external surface at pocket height, thereby allowing the pencil to be carried conveniently in a consumer's pocket.

The lever 48 and the girdle 49 are pressed from phosphor bronze 20 swg sheet, lower edge of the lever 48 and corners thereat being bevelled and rounded.

A peelable tamper proof wrap seal adheres over each of the joints at the crown of the capsule 22, 32 and at the upper termination of the cap 13.

Name, composition and quantity of a drink producible from a beverage making pencil of this invention is displayed on a label on the cap 13, being 'two cups of instant coffee with milk powder and low calorie sugar' in the present example, but could be any of a wide variety of beverage compositions, such as 'one cup of instant arabica' or 'four cups of instant coffee of a particular caffeine content', or 'two cups of instant tea', or 'three cups of instant tea with low fat milk and low calories sugar', or 'two cups of instant tea with sugar and lemon', or 'three glasses of lemonade', or 'three cups of milk powder of a certain fat and nutritives content, and sugar', or a sherbet of any particular brand name, or a soup, or a chocolate or a cocoa product, and the like.

Washing, drying, sterilizing of component parts of the device, filling of the stuff 11 in the pouch 14 and of the adjuncts in the capsules 22, 32, assembly of components of the device, and packaging are effected rapidly in automat machines tailor made for the device by automat designing and manufacturing companies.

A consumer operates device as follows. Immediately before preparing a beverage seals are peeled off a hand held beverage making pencil just over a vessel of beverage preparation, which could be a cup, mug, glass or other, containing liquid medium of the desired beverage. The medium in present example is hot water but could be cold water, soda or the like.

Opening the respective capsules 22, 32 desired amounts of the adjuncts 21, 31 are poured into the medium one by one. The respective capsule is shut back after the pouring and the plug 42 is replaced on the uppermost capsule. The Cap 13 is then disjoined, inverted and affixed on the crown of the plug 42 for duration of the beverage preparation.

The stuff 11, the pouch 14 and the framework 12 cooperatively functioning as a commingling infuser stirrer are dipped and shuffled in the medium, this movement of the stirrer causing the medium to impinge on the stuff 11 and also letting the stuff 11 traverse firmly across and mingle with bulk of the medium in all regions of the vessel at the same time mixing the medium and the prepared beverage, thereby aiding infusion commingling and stirring respectively, which enhances combination of the stuff 11 and the medium and promotes dissolving of the adjuncts too.

Injection of any desired fluid such as steam, or air for frothing or a carbonating gas mixture, through the source stuff 11 and into the prepared beverage in the vessel is effected under an injection pressure of the order of 1.5 atmospheres obtainable through a nozzle of a contraption for supplying the fluid, by means of manually introducing 4 mm length at tip of the delivery end of the nozzle so as to fit horizontally into the passage 45 after puncturing the diaphram 46 whereby the fluid flows through the passage 45, thereafter flowing out of the perforations in the wall of the tube 47 and through the stuff 11 into the beverage till infusion of the stuff 11 and after the infusion of the stuff 11 the fluid flows out of the perforations directly into the beverage.

The consumer monitors the drink and when desired strength and flavour of the beverage have been reached consumption follows.

At any time during beverage preparation the used and wet pouch 14 firmly united to the pedestal 16 and supported unflinchingly on the framework 12 can be wiped neatly at inner brim of the vessel letting droplets trickling from the pouch 14 fall into the vessel without allowing any strewing of liquid outside the vessel, thereafter the moist pouch 14 fastened to the pedestal 16 withdrawn away from the vessel, to be encased again in the cavity of the cap 13, the device put away, or placed into any available saucer, or back into purse or pocket of the consumer for making a second cup of the beverage later on from therein remaining beverage ingredients.

Many ramifications of the device are possible. For example the lowest capsule and the adjuncts containing capsules 22, 32 are assembled in any convenient sequence, or in an alternative configuration the capsules are assembled in a cluster formation not end to end but in sideways parallel or angular aspect. The device can be elliptical or hexagonal instead of round shaped straight cylinder. The pedestal 16 can be of any shape, size, firm or flexible. The cage of the framework 12 can have various configurations, such as the ribs in a helical or spiral formation and support a pouch externally or internally. More than one pouch can be employed, which could be moulded integrally with the pedestal in the device of this invention.

It can be seen that components of body of the device are uncomplicated and so producible inexpensively; besides, original cost of body of the device can be amortised over refillings and reuse so the consumer may pay almost only for cost of the fillings, cost of body of the device itself contributing very little to retail price of the beverage making pencil of this invention. Yet, conveniences ensuing from the method, means and device of this invention are remarkable.

A consumer need arrange only for a liquid medium of a beverage. For example, to prepare hot tea or coffee, potable hot water is all that is required in a readily available ceramic or paper or other cup. Potable hot water being a commodity common to many cooking and other requirements is normally easily available anywhere from a tap or from a tank.

Thereafter all that a consumer has to do is to simply get a beverage making pencil of this invention which may even be accompanying him/her in purse or pocket, and easily and quickly prepare a fine drink of his specific choice with desired amounts of desired adjuncts.

Strength of the beverage can be finely controlled by the consumer and so there is no need to tolerate a drink which may be stronger or weaker than what the consumer would like to have.

There is no need to go looking for nor to even reach out for the adjuncts. There is no need to search for the spoons. These are all available within the package of the beverage making pencil of this invention.

Menace of infected spoons specially from contaminations acquired by the spoons between their cleaning and actual use is avoided here as the stirrer is enclosed in sterilized package of the invention upto the moment of use.

A consumer who was hitherto restricted to drink a beverage sans the adjuncts because of inconvenience of arranging for the adjuncts and the spoons and/or because of risk of an infected spoon contaminating his drink can now get the adjuncts of his choice readily when he is preparing his drink by means of the device of this invention.

Only one vessel is required, which vessel functions as receptacle for the liquid medium, as vessel of the beverage preparation, and also as vessel of beverage consumption. No underplate of the vessel, nor any saucer is necessary, because there are no spoons nor a wet tea bag to be kept thereon.

Chances of unscruplous adulteration during trading and handling from warehouse of a packer to tea table of an ultimate consumer are avoided, the source stuff and the adjuncts reaching the ultimate consumer in sealed enclosures of the device.

Minimal volumes of beverage ingredients of low commercial value are packaged in a beverage making pencil of this invention after consuming which an ultimate consumer can change over to a beverage of a different variety or to a beverage of a different composition.

Housewives, school-going children, busy executives, itinerant persons, sick patients, all benefit by practicability of the composite, quick, reliably clean, no fuss, light weight, wide choice hand held beverage maker of this invention.

A connoisseur of beverages appreciates the control over composition and strength of a beverage provided easily by the method, means and device of this invention.

Scope of the invention should be determined by the appended claims and their legal equivalents, rather than by the example contained herein. Specificities in my descriptions should not be construed as limitations on the invention.

I claim:

1. A hand-held beverage preparation device for preparing a beverage from a liquid in a vessel comprising:

a pedestal including an upper end and a lower end;

a porous pouch mounted to said lower end of said pedestal in which an extractable beverage making ingredient can be provided; and an impervious cap which is removably attached to said upper end of said pedestal and which said cap together with said upper end of said pedestal totally encloses said pouch such that upon removal of said cap, said upper end of said pedestal is grasped to lower said pouch into the liquid in the vessel to stir the liquid with said pouch and thus to diffuse the beverage ingredient into the liquid to form the beverage and then said cap is reattached to prevent leakage from the pouch.

2. A hand-held beverage preparation device as claimed in claim 1:

wherein said pedestal has a longitudinal and said lower end of said pedestal includes a pervious framework extending axially downward away from said upper end;

wherein said pouch encloses said framework, said pouch having a lower closed end and an open upper end through which said framework is received; and further including a mounting means for mounting said open upper end of said pouch to a portion of said lower end of said pedestal above said framework.

3. A hand-held beverage preparation device as claimed in claim 2:

wherein said framework is formed by a plurality of ribs extending axially.

4. A hand-held beverage preparation device as claimed in claim 2:

wherein said framework further includes a ring to which distal ends of said ribs are integrally attached.

5. A hand-held beverage preparation device as claimed in claim 2:

wherein said mounting means removably mounts said open upper end of said pouch to said portion of said lower end of said pedestal.

6. A hand-held beverage preparation device as claimed in claim 1 further including:

a container having a longitudinal axis and which is hollow and impervious, said container being closed radially about the longitudinal axis by an enclosing wall, having at an upper part an upper open axial end, and being enclosed at a lower part by a lower axial end which is integral with said upper end of said pedestal; and a removable closure for said upper open axial end of said container such that an adjunct for the beverage can be imperviously contained in said axial container and upon removal of said closure of said container the adjunct can be added to the liquid.

7. A hand-held beverage preparation device as claimed in claim 6:

wherein said removable closure is a second container similar to said first-mentioned container, and in which is contained a second adjunct for the beverage and to which a second removable closure is attached to close said second axial container.

8. A hand-held beverage preparation device as claimed in claim 6:

wherein said container and said pedestal are substantially cylindrical and coaxially attached.

9. A hand-held beverage preparation device as claimed in claim 1 and further including:

an attaching means for removably attaching said lower end of said pedestal to said upper end of said pedestal.

10. A hand-held beverage preparation device as claimed in claim 9:

wherein said attaching means removably attaches said upper end of said pedestal to said closed end of said container.

11. A hand-held beverage preparation device as claimed in claim 1:

wherein said pedestal further includes a passage therethrough extending from inside of said framework to an exterior portion of said upper end, and a tube located in said framework connected at one end to said passage and having a free end located in said pouch.

12. A hand-held beverage preparation device as claimed in claim 1:

wherein said cap includes fork projections extending exteriorly therefrom.

13. A hand-held beverage preparation device as claimed in claim 1:

wherein said cap includes a knife projection extending exteriorly therefrom.

14. A hand-held beverage preparation device for preparing a beverage from a liquid in a vessel comprising:

a container having a longitudinal axis and which is hollow and impervious, said container being closed radially about the longitudinal axis by an enclosing wall, having at an upper part an upper open axial end, and being enclosed at a lower part by a lower axial end;

an adjunct for a beverage located in said container;

a removable closure for said upper open axial end of said container to imperviously contain said adjunct in said container;

a pedestal having a longitudinal axis and including an upper end and a pervious framework extending axially downward from said upper end;

an attaching means for attaching said axial pedestal to said lower end of said container;

a pouch which encloses said framework, said pouch being porous and having a lower closed end and an open upper end through which said framework is received;

a mounting means for mounting said open upper end of said pouch to said upper end of said pedestal;

an extractable beverage making ingredient which is retained in said pouch mounted on said pedestal; and an impervious cap which is removably attached to said lower axial end of said container to sealingly enclose said pedestal and attached pouch such that (a) upon removal of said cap, said container is grasped to lower said pouch into the liquid in the vessel to stir the liquid with said framework and thus to diffuse said beverage ingredient into the liquid to form the beverage and (b) upon removal of said closure of said container, said adjunct is added to the liquid.

15. A hand-held beverage preparation device as claimed in claim 14:

wherein said removable closure is a second container similar to said first-mentioned container, and in which is contained a second adjunct for the beverage and to which a second removable closure is attached to close said second container.

16. A hand-held beverage preparation device as claimed in claim 15:

wherein said axial container and said pedestal are substantially cylindrical and said attaching means coaxially attaches said pedestal to said container; and wherein said framework is formed by a plurality of ribs extending axially from said upper end of said pedestal.

17. A hand-held beverage preparation device as claimed in claim 16:

wherein said mounting means removably mounts said open upper end of said pouch to said upper end of said pedestal.

18. A hand-held beverage preparation device as claimed in claim 17:

wherein said framework further includes a ring below said upper end of said pedestal to which distal ends of said ribs are integrally attached.

19. A hand-held beverage preparation device as claimed in claim 16:

wherein said pedestal further includes a passage therethrough extending from inside of said framework to an exterior portion of said upper end, and a tube located in said framework connected at one end to said passage and having a free end located in said source stuff in said pouch.

20. A hand-held beverage preparation device as claimed in claim 16:

wherein said cap includes one of (a) fork projections and (b) a knife projection, said projections or projection extending exteriorly from said cap.

* * * * *